United States Patent
Ni et al.

(10) Patent No.: US 10,120,109 B2
(45) Date of Patent: Nov. 6, 2018

(54) LIGHT EMITTING DEVICE CAPABLE OF REDUCING REFLECTED LIGHT AND CHANGING A FOCUSED POSITION OF INCIDENT LIGHT

(71) Applicants: LITE-ON ELECTRONICS (GUANGZHOU) LIMITED, Guangzhou (CN); Lite-On Technology Corporation, Taipei (TW)

(72) Inventors: Ching-Tsung Ni, Taipei (TW); Tai-Jung Sung, Taipei (TW); Kuo-Hui Chang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/630,950

(22) Filed: Jun. 23, 2017

(65) Prior Publication Data

US 2018/0164473 A1 Jun. 14, 2018

(30) Foreign Application Priority Data

Dec. 13, 2016 (TW) .............................. 105141273 A
May 15, 2017 (TW) .............................. 106115932 A

(51) Int. Cl.
 *G02B 5/00* (2006.01)
 *F21V 23/00* (2015.01)
 *H05B 33/04* (2006.01)
 *F21V 17/04* (2006.01)

(52) U.S. Cl.
 CPC .............. *G02B 5/001* (2013.01); *F21V 17/04* (2013.01); *F21V 23/001* (2013.01); *H05B 33/04* (2013.01)

(58) Field of Classification Search
 CPC ....... G02B 5/001; H05B 33/04; F21V 23/001; F21V 17/04
 See application file for complete search history.

(56) References Cited

U.S. PATENT DOCUMENTS

| | | | |
|---|---|---|---|
| 7,092,143 B2 * | 8/2006 | Heureux ............ | G02B 26/0833 348/E5.142 |
| 2013/0037727 A1 * | 2/2013 | Maeda ............... | G01N 21/6428 250/458.1 |
| 2015/0036354 A1 | 2/2015 | Adams et al. | |
| 2015/0108516 A1 * | 4/2015 | Yang ...................... | H01L 33/44 257/89 |
| 2016/0059873 A1 | 3/2016 | Temming | |

FOREIGN PATENT DOCUMENTS

| | | |
|---|---|---|
| DE | 102013214342 | 7/2014 |
| EP | 0299091 | 1/1989 |
| TW | 200613888 | 5/2006 |
| TW | 201517316 | 5/2015 |

OTHER PUBLICATIONS

"Office Action of Taiwan Counterpart Application", dated Mar. 20, 2018, p. 1-p. 4.

* cited by examiner

*Primary Examiner* — Tracie Y Green
(74) *Attorney, Agent, or Firm* — JCIPRNET

(57) ABSTRACT

A light emitting device includes a casing, a light blocking member, and a light emitting unit. The light blocking member is disposed within the casing, and is adapted to block an ambient light incident into the casing. The light emitting unit is disposed within the casing.

19 Claims, 16 Drawing Sheets

LIGHT EMITTING DEVICE CAPABLE OF REDUCING REFLECTED LIGHT AND CHANGING A FOCUSED POSITION OF INCIDENT LIGHT

CROSS REFERENCE TO RELATED APPLICATION

This application claims the priority benefits of Taiwan application serial no. 105141273, filed on Dec. 13, 2016, and Taiwan application serial no. 106115932, filed on May 15, 2017. The entirety of each of the above-mentioned patent applications is hereby incorporated by reference herein and made a part of specification.

BACKGROUND OF THE INVENTION

Field of the Invention

The invention relates to a light emitting device, and particularly relates to a light emitting device capable of reducing reflected light and changing a focused position of incident light.

Description of Related Art

Most of the conventional traffic light devices with a surface light source include a front cover, a rear cover, a point light source, and an internal component. The front cover has a lens part, a containing space is defined by the front cover and the rear cover, the point light source and the internal component are disposed on the rear cover and located in the containing space. When ambient light is emitted into the containing space through the lens part of the front cover, the incident ambient light is irradiated onto the rear cover and reflected out of the front cover. In the scenario, whether the point light source is lit up or not, a viewer may be misled to perceive that the traffic light device emits light. The safety on the road is thus affected. Besides, since the front cover has the lens part, the ambient light emitted into the containing space may be focused onto the internal component, and the high temperature is therefore generated at the focused position. So, the internal component may be damaged. Hence, how to modify the traffic light device with the surface light source has become an issue to work on.

SUMMARY OF THE INVENTION

The invention provides a light emitting device capable of reducing a chance that ambient light is reflected to a viewer after being irradiated into a casing and capable of changing a focused position of the incident ambient light.

The light emitting device of the invention includes a casing, a light blocking member, and a light emitting unit. The light blocking member is disposed within the casing and is adapted to block an ambient light incident into the casing. The light emitting unit is disposed within the casing.

In an embodiment of the invention, the light blocking member is a light shielding cap having an accommodation opening and a plurality of cavity structures disposed around the accommodation opening. Each of the plurality of cavity structures blocks the ambient light incident into the casing in a multi-reflection manner. The light emitting unit is disposed in the accommodation opening correspondingly.

In an embodiment of the invention, a top-view shape of each of the plurality of the cavity structures includes a polygon shape, a circular shape, an oval shape, or an irregular shape. A ratio of a depth to a width of each of the plurality of the cavity structures falls in a range from 1 to 100.

In an embodiment of the invention, a surface of the light blocking member is coated with a light absorbing material.

In an embodiment of the invention, depths of the plurality of the cavity structures are identical of different.

In an embodiment of the invention, a blocking angle of the light blocking member is greater than a light emitting angle of the light emitting unit.

In an embodiment of the invention, the light blocking member includes a first light shielding cap and a second light shielding cap. The first light shielding cap is assembled with the second light shielding cap. The first light shielding cap is located between the second light shielding cap and the light emitting unit.

In an embodiment of the invention, the light emitting device further includes a Fresnel lens disposed on the light blocking member to straighten a beam emitted by the light emitting unit.

In an embodiment of the invention, the light blocking member is a light absorption grating and blocks the ambient light incident into the casing in an absorbent manner.

In an embodiment of the invention, the light emitting device further includes a Fresnel lens disposed between the light blocking member and the light emitting unit to straighten a beam emitted by the light emitting unit.

In an embodiment of the invention, the light blocking member includes a plurality of light absorbing structures separated from one another and disposed on the Fresnel lens. A length and a width of each of the plurality of the light absorbing structures fall in a range from 10 mm to 300 mm. A thickness of each of the plurality of the light absorbing structures falls in a range from 0.1 mm to 10 mm. A number of the plurality of the light absorbing structures falls in a range from 2 sheets to 10000 sheets. An inclination angle of each of the plurality of the light absorbing structures with respect to the Fresnel lens falls in a range from 0 degree to 180 degree.

In an embodiment of the invention, the light blocking member includes a light shielding cap and a light absorption grating. The light absorption grating is disposed on the light shielding cap and blocks the ambient light incident into the casing in an absorbent manner. The light shielding cap is located between the light absorption grating and the light emitting unit and blocks the ambient light incident into the casing in a multi-reflection manner.

In an embodiment of the invention, the light shielding cap has an accommodation opening and a plurality of cavity structures disposed around the accommodation opening. Each of the plurality of cavity structures blocks the ambient light incident into the casing in a multi-reflection manner. The light emitting unit is disposed in the accommodation opening correspondingly.

In an embodiment of the invention, the light emitting device further includes a Fresnel lens disposed between the light shielding cap and the light absorption grating to straighten a beam emitted by the light emitting unit.

In an embodiment of the invention, the light absorption grating includes a plurality of light absorbing structures separated from one another and disposed on the Fresnel lens. A length and a width of each of the plurality of the light absorbing structures fall in a range from 10 mm to 300 mm. A thickness of each of the plurality of the light absorbing structures falls in a range from 0.1 mm to 10 mm. A number of the plurality of the light absorbing structures falls in a range from 2 sheets to 10000 sheets. An inclination angle of each of the plurality of the light absorbing structures with respect to the Fresnel lens falls in a range from 0 degree to 180 degree.

In an embodiment of the invention, the casing includes a front cover and a rear cover. The front cover is assembled with the rear cover and defines an accommodation space with the rear cover. The light blocking member and the light emitting unit are located in the accommodation space.

In an embodiment of the invention, the front cover has a lens part. The ambient light enters the casing through the lens part.

In an embodiment of the invention, the light blocking member and the light emitting unit are disposed on the rear cover of the casing.

In an embodiment of the invention, the light blocking member is a light shielding cap. A first vertical distance is provided between a side of the light shielding cap relatively adjacent to the light emitting unit and the rear cover. A second vertical distance is provided between another side of the light shielding cap relatively distant to the light emitting unit and the rear cover. The second vertical distance is greater than the first vertical distance. The light shielding cap is in a funnel shape.

In an embodiment of the invention, the light emitting device further includes at least one internal component disposed on the rear cover of the casing. An orthographic projection of the light blocking member on the rear cover overlaps an orthographic projection of the internal component on the rear cover.

In an embodiment of the invention, the light blocking member is disposed parallel to the rear cover.

In an embodiment of the invention, the light blocking member is a light shielding cap. The light emitting device further includes a plurality of supporting members disposed between the light shielding cap and the rear cover, so as to define a configuration space between the light shielding cap and the rear cover.

In an embodiment of the invention, an internal surface of the front cover has a plurality of micro structures. The plurality of the micro structures are connected to one another.

Based on the above, in the design of the light emitting device of the invention, the light blocking member is adapted to block an ambient light incident into the casing so as to reduce the chance that the ambient light is reflected to the viewer after being irradiated into the casing. Accordingly, when the light emitting unit is not lit up, the viewer may be prevented from being misled to perceive that the light emitting device emits light. In addition, the design of the light blocking member of the invention may further change the focused position of the ambient light, so as to avoid damages to the internal components due to a high temperature caused by focusing of the light.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In embodiments of the invention, a light emitting device includes a casing, a light blocking member, and a light emitting unit. The light blocking member is disposed within the casing and is adapted to block an ambient light incident into the casing. The light emitting unit is disposed within the casing. The light blocking member may be a light shielding cap, a light absorption grating, or a combination of a light shielding cap and a light absorption grating, so as to block the ambient light incident into the casing in a multi-reflection manner/and an absorbent manner and reduce the chance that the ambient light is reflected to the viewer after being irradiated into the casing. The following embodiments are used to explain the light emitting device of the invention.

Figure 1A:
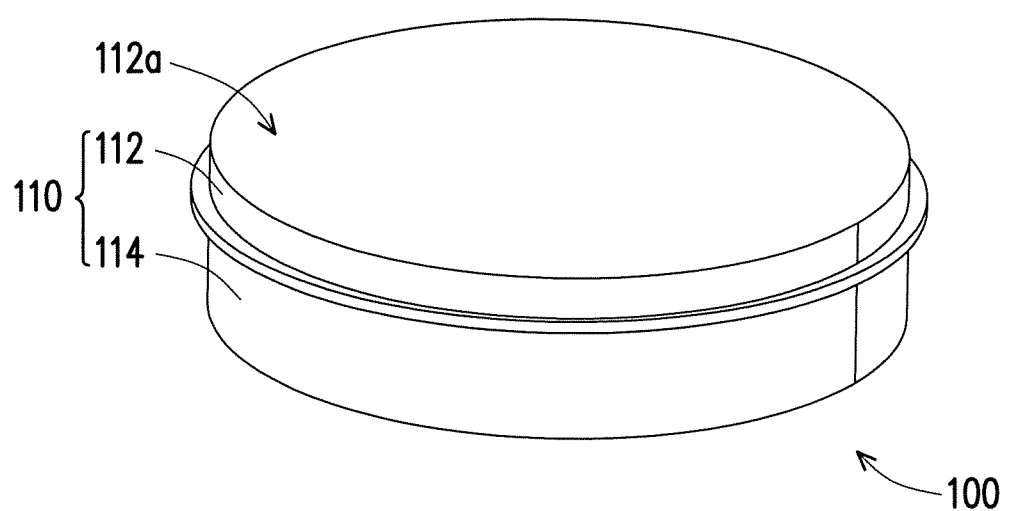
FIG. 1A is a three-dimensional schematic view of a light emitting device in an embodiment of the invention.
Figure 1B:
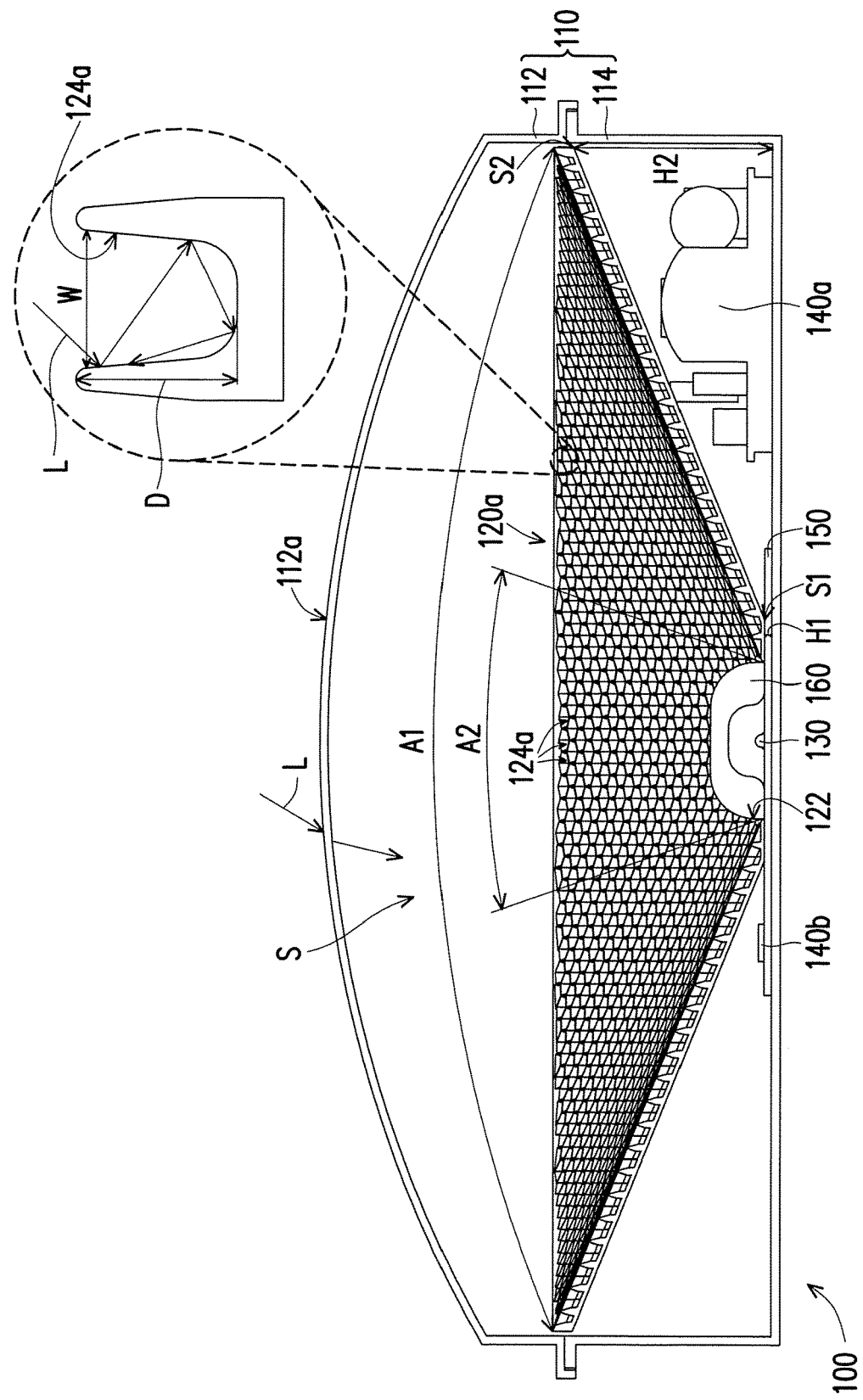
FIG. 1B is a schematic cross-sectional view of the light emitting device in FIG. 1A.
Figure 1C:
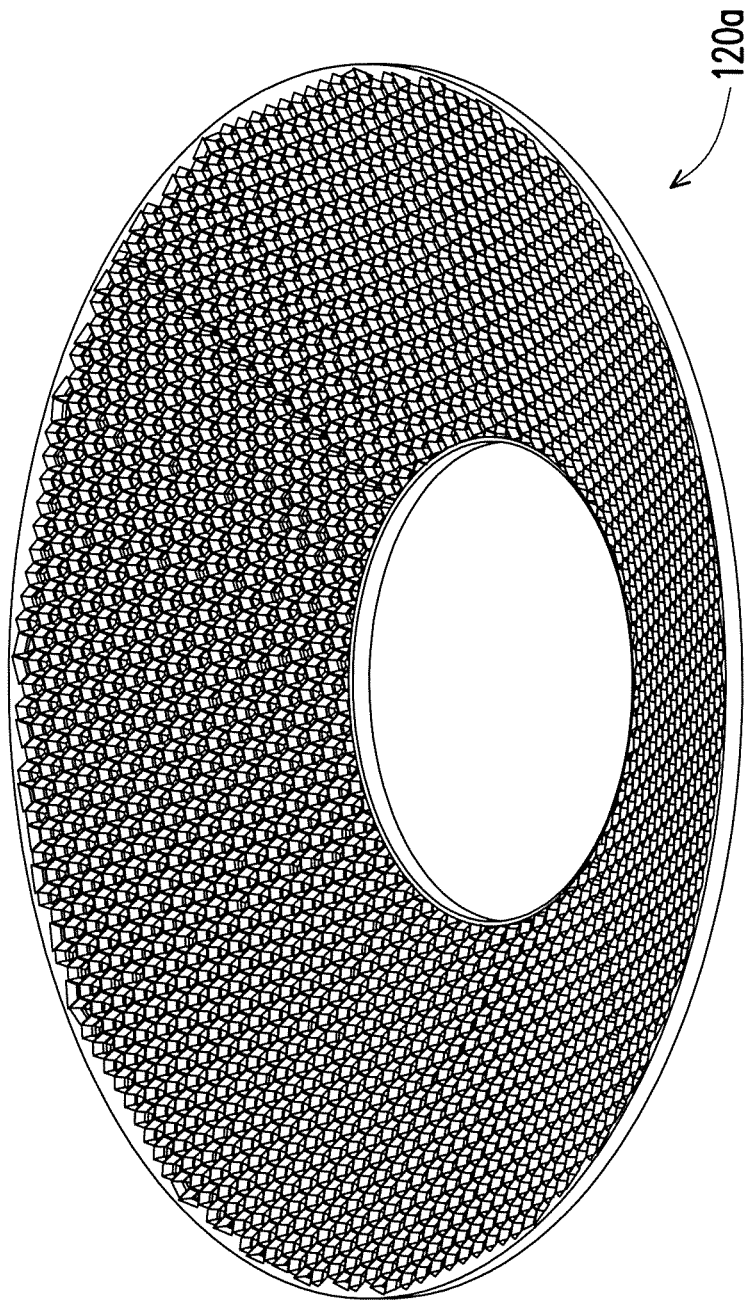
FIG. 1C is a three-dimensional schematic view of a light shielding cap in FIG. 1B.
Figure 1D:
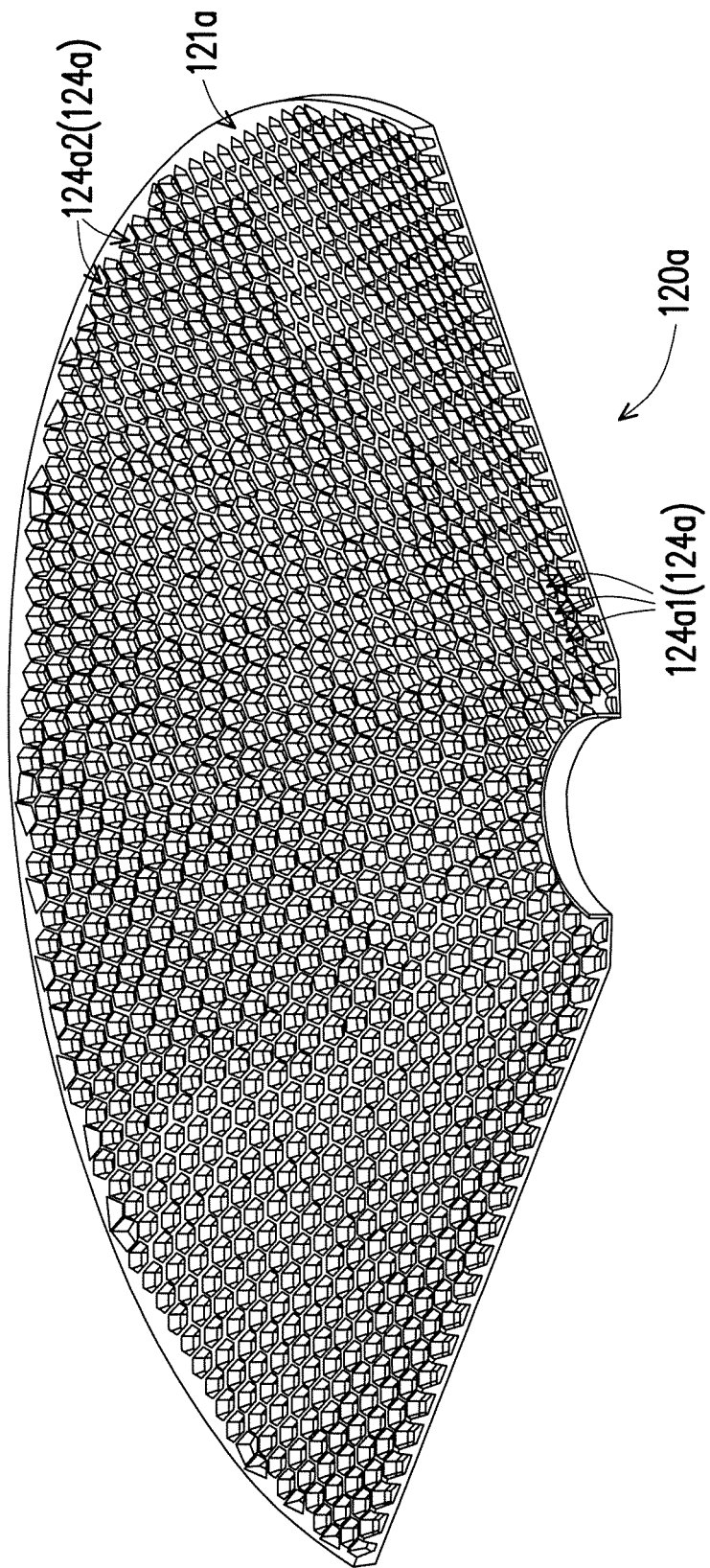
FIG. 1D is a partial three-dimensional schematic cross-sectional view of a light shielding cap in FIG. 1C.

FIG. 1A is a three-dimensional schematic view of a light emitting device in an embodiment of the invention. FIG. 1B is a schematic cross-sectional view of the light emitting device in FIG. 1A. FIG. 1C is a three-dimensional schematic view of a light shielding cap in FIG. 1B. FIG. 1D is a partial three-dimensional schematic cross-sectional view of a light shielding cap in FIG. 1C. Referring to FIG. 1A, FIG. 1B, FIG. 1C, and FIG. 1D altogether, a light emitting device 100 includes a casing 110, a light shielding cap 120a, and a light emitting unit 130. The light shielding cap 120a is disposed within the casing 110 and has an accommodation opening 122 and a plurality of cavity structures 124a disposed around the accommodation opening 122. Each of the cavity structures 124a is adapted to reflect an ambient light L incident into the casing 110 for multiple times. The light emitting unit 130 is disposed within the casing 110 and is disposed within the accommodation opening 122 of the light shielding cap 120a correspondingly.

More specifically, referring to FIG. 1B, the casing 110 in this embodiment includes a front cover 112 and a rear cover 114. The front cover 112 is assembled to the rear cover 114 and defines an accommodation space S with the rear cover 114. The light shielding cap 120a and the light emitting unit 130 are located within the accommodation space S. The front cover 112 has a lens part 112a. The ambient light L enters the casing 110 through the lens part 112a. The light shielding cap 120a and the light emitting unit 130 are disposed on the rear cover 114 of the casing 110. Moreover, a circuit board 150 is disposed on the rear cover 114 in this embodiment, while the light emitting unit 130 and the light shielding cap 120a are disposed on the circuit board 150. The light emitting unit 130 is electrically connected to the circuit board 150. The light emitting device 100 in this embodiment further includes a lens 160 disposed within the accommodation opening 122 and covering the light emitting unit 130, so as to increase a light emitting efficiency of the light emitting unit 130.

Referring to FIG. 1C and FIG. 1D, the light blocking member in this embodiment is in fact the light shielding cap 120a. The light shielding cap 120a is specifically a mask with a substantially uniform thickness. The light shielding cap 120a has a plurality of cavity structures 124a. In addition, depths of the cavity structures may be identical or different. That is to say, the light shielding cap 120a may have cavity structures 124a with identical depth, or the light shielding cap 120a may have cavity structures 124a with different depths. The invention is not limited to the above. The light shielding cap 120a may, for example, be made of dark materials that are capable of absorbing lights. The invention is not limited to the above. Top-view shapes of the cavity structures 124a in this embodiment may be, for example, a polygon shape, a circular shape, an oval shape, or an irregular shape. As shown in FIG. 1D, the cavity structures 124a further include a plurality of cavity structures 124a1 and a plurality of cavity structures 124a2. In addition, top-view shapes of the cavity structures 124a1 are specifically a hexangular shape. Top-view shapes of the cavity structures 124a2 are specifically an irregular shape since an area of an edge of the cavity structures 124a2 bordering with the light shielding cap 120a is insufficient.

Figure 2A:
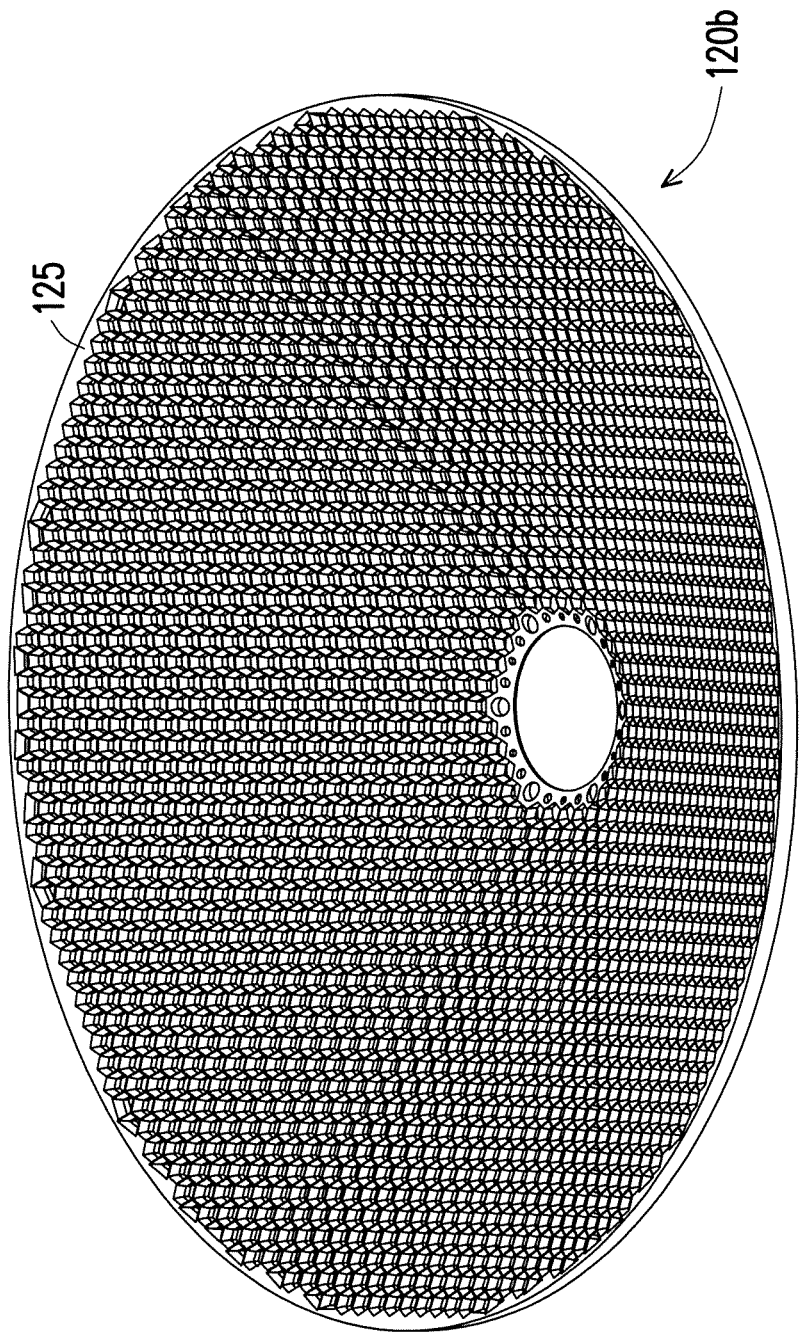
FIG. 2A is a three-dimensional schematic view of a light shielding cap in another embodiment of the invention.
Figure 2B:
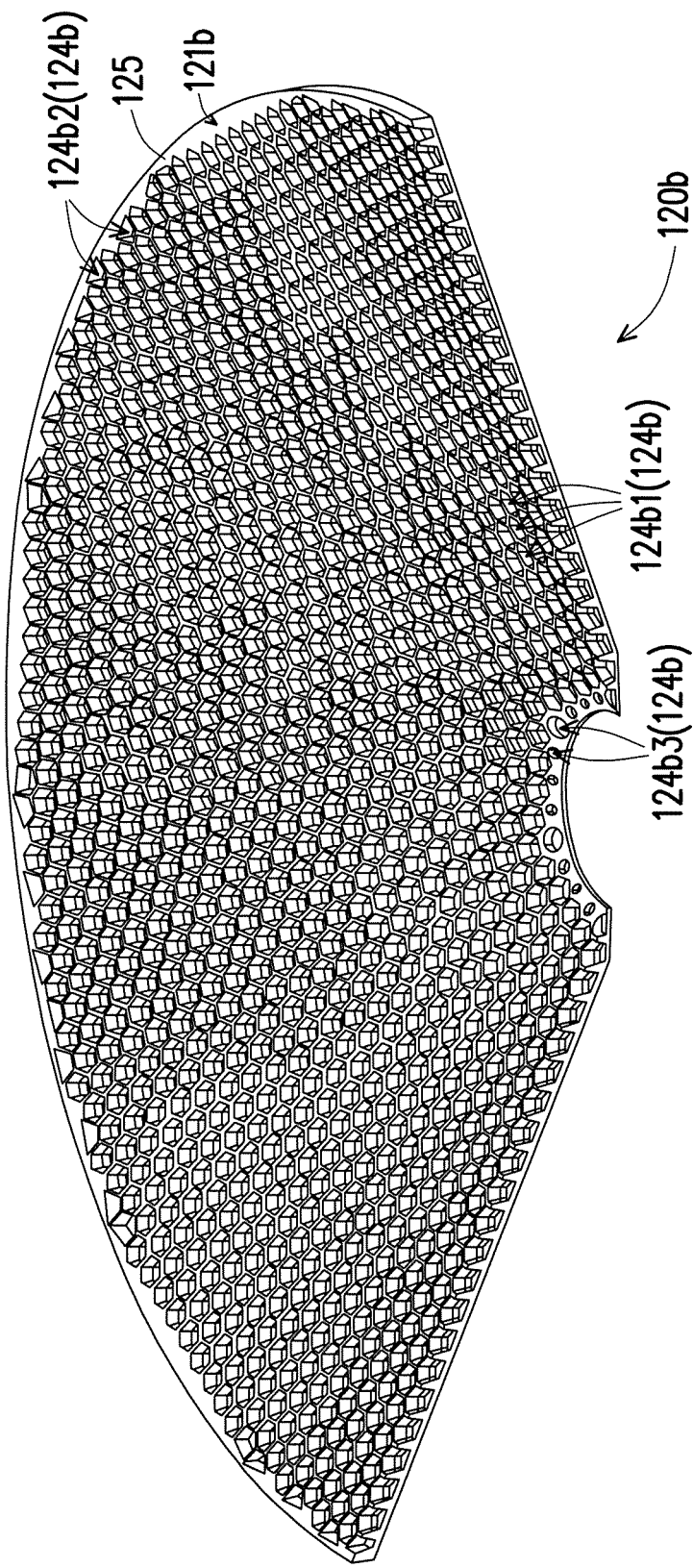
FIG. 2B is a partial three-dimensional schematic cross-sectional view of the light shielding cap in FIG. 2A.

Undoubtedly, the invention does not limit the top-view shapes of the cavity structures 124a. In other embodiments, referring to FIG. 2A and FIG. 2B, cavity structures 124b of a light shielding cap 120b include a plurality of cavity structures 124b1, a plurality of cavity structures 124b2, and a plurality of cavity structures 124b3. Top-view shapes of the cavity structures 124b1 are specifically a hexangular shape. Top-view shapes of the cavity structures 124b2 and 124b3 are specifically an irregular shape and a circular shape since an area of an edge of the cavity structures 124b2 and 124b3 bordering with the light shielding cap 120a is insufficient.

Figure 3A:
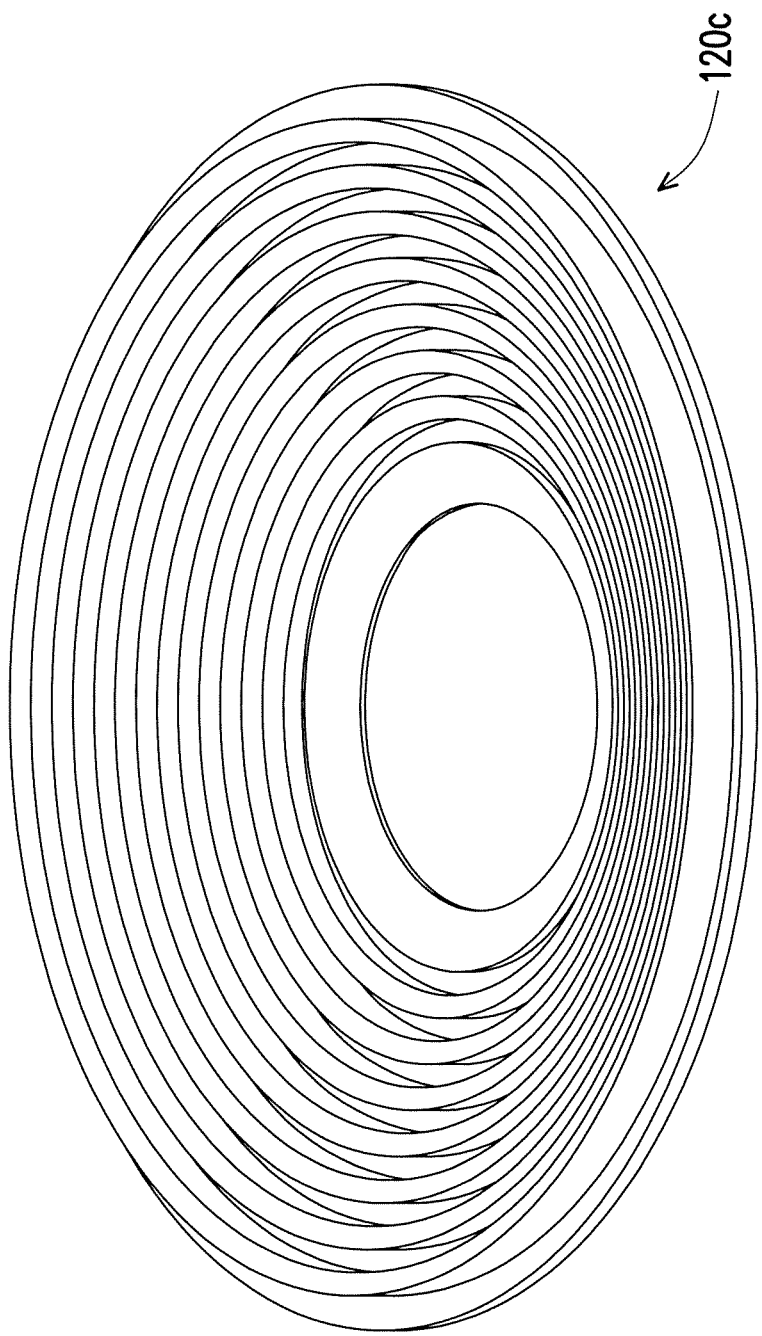
FIG. 3A is a three-dimensional schematic view of a light shielding cap in yet another embodiment of the invention.
Figure 3B:
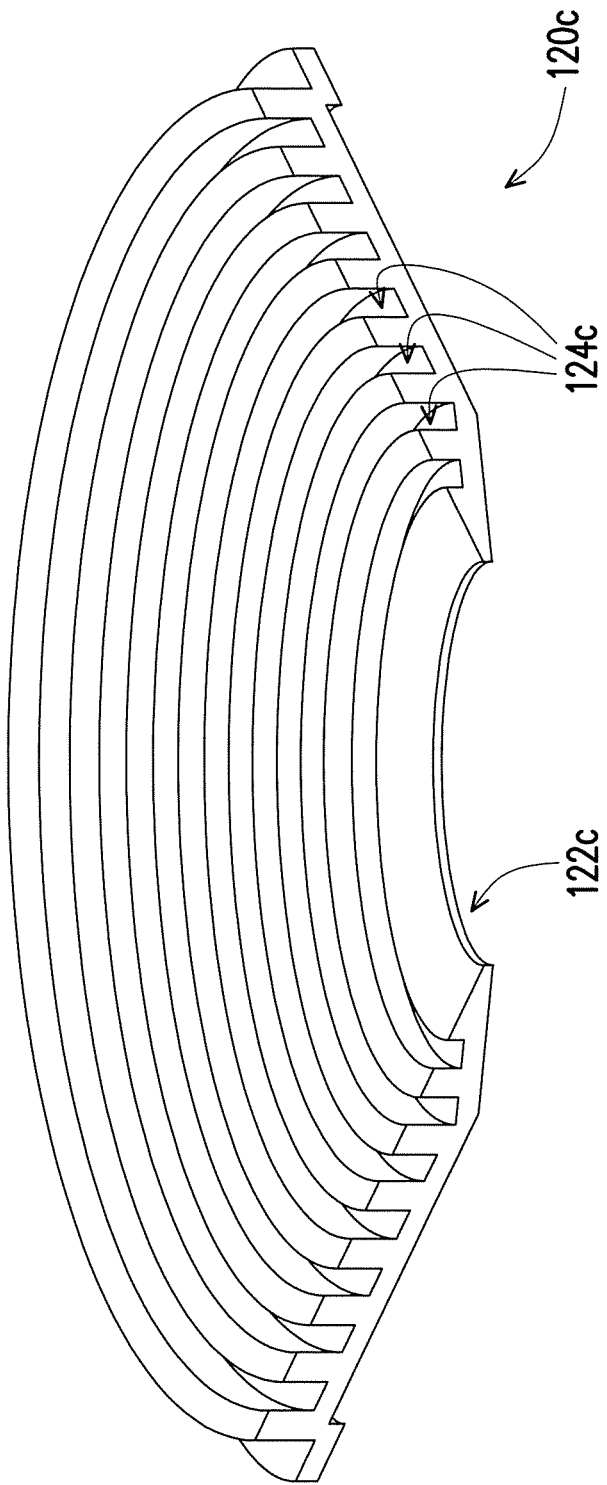
FIG. 3B is a partial three-dimensional schematic cross-sectional view of the light shielding cap in FIG. 3A.

The cavity structures 124a and 124b of the light shielding caps 120a and 120b are distributed on and across surfaces 121a and 121b. The cavity structures 124a and 124b are all arranged closely adjacent to one another and approximately in an array, but the invention is not limited thereto. In other embodiments, referring to FIG. 3A and FIG. 3B, cavity structures 124c of a light shielding cap 120c are specifically arranged in concentric circles around an accommodation opening 122c and arranged outwards from the accommodation opening 122c circle by circle. Top-view shapes of the cavity structures 124c are specifically a circular shape.

Again referring to FIG. 1B, for multiple times of reflection, a ratio of a depth D of the cavity structures 124a to a width W of the cavity structures 124a falls, preferably, in a range from 1 to 100. Since the ratio of the depth D of the cavity structures 124a to the width W of the cavity structures 124a in this embodiment falls in the range from 1 to 100, the incident ambient light L is reflected and spread for multiple times in the cavity structures 124a and then absorbed by the cavity structures 124a when radiating onto the cavity structures 124a. In other words, the design of the cavity structures 124a in this embodiment is able to increase a ratio of absorption of the incident ambient light L, so as to reduce a chance that the ambient light L is reflected to a viewer.

Moreover, as shown in FIG. 1B, a first vertical distance H1 is provided between a side S1 of the light shielding cap 120a relatively adjacent to the light emitting unit 130 and the rear cover 114. A second vertical distance H2 is provided between another side S2 of the light shielding cap 120a relatively distant to the light emitting unit 130 and the rear cover 114. The second vertical distance H2 is greater than the first vertical distance H1. In other words, referring to FIG. 1C, the light shielding cap 120a of the embodiment is substantially in a funnel shape. Nevertheless, the invention is not limited to the above.

Particularly, as shown in FIG. 1B, a light shielding angle A1 (may be taken as a blocking angle) of the light shielding cap 120a in this embodiment is greater than a light emitting angle A2 of the light emitting unit 130. The light emitting unit 130 is, for example, a point light source such as a red light emitting diode, a green light emitting diode, or a yellow light emitting diode. Nevertheless, the invention is not limited to the above. Here, the light shielding angle A1 falls, for example, in a range from 141 degree to 180 degree. The light emitting angle A2 of the light emitting unit 130 falls, for example, in a range from 0 degree to 140 degree. Since the light shielding angle A1 of the light shielding cap 120a is greater than the light emitting angle A2 of the light emitting unit 130 in this embodiment, the disposition of the light shielding cap 120a does not confine or block a range of the light emission of the light emitting unit 130.

Additionally, the light emitting device 100 in this embodiment further includes at least one internal component (two internal components 140a and 140b are depicted in FIG. 1B) disposed on the rear cover 114 of the casing 110. The internal components 140a and 140b are, for example, chips, circuit boards, or combinations thereof. Particularly, an orthographic projection of the light shielding cap 120a on the rear cover 114 is overlapped with orthographic projections of the internal components 140a and 140b on the rear cover 114. Thereby, when the ambient light L incident into the accommodation space S of the casing 110, the cavity structures 124a of the light shielding cap 120a reflect and spread the ambient light L incident into the casing 110 for multiple times, so as to absorb and reduce an energy of the ambient light L. The cavity's structures 124a are also able to absorb the heat. Moreover, the light shielding cap 120a is disposed in front of the internal components 140a and 140b, such that a position of a focal point of the ambient light L may be changed through disposing the cavity structures 124a. As a result, the position of the focal point of the incident ambient light L may be prevented from being located at the internal components 140a and 140b, so as to avoid damages to the internal components 140a to 140b due to a high temperature. In other words, with the design of the cavity structures 124a, a light path of the ambient light L is distorted, and the energy of the ambient light L is received, so as to reduce the reflected light.

Again referring to FIGS. 2A and 2B, the light shielding cap 120b in this embodiment is not manufactured by using a dark light absorbing material. However, the surface 121b of the light shielding cap 120a may also be coated with a light absorbing material 125, so as to increase a light absorbing efficiency of the light shielding cap 120a. In addition, the light absorbing material 125 is, for example, a carbon nanotube, a black resin, or other dark paints. When the ambient light L enters the accommodation space S (referring to FIG. 1B) through the lens parts 112a of the front cover 112, the incident ambient light L may be irradiated onto the light shielding cap 120b and absorbed in the cavity structures 124b through multiple times of reflection and spreading. Since the surface 121b of the light shielding cap 120b is coated with the light absorbing material 125, the ratio of absorption of the ambient light L by the light shielding cap 120b is thereby increased, and the chance that the incident ambient light L is reflected to the viewer is reduced.

Figure 4A:
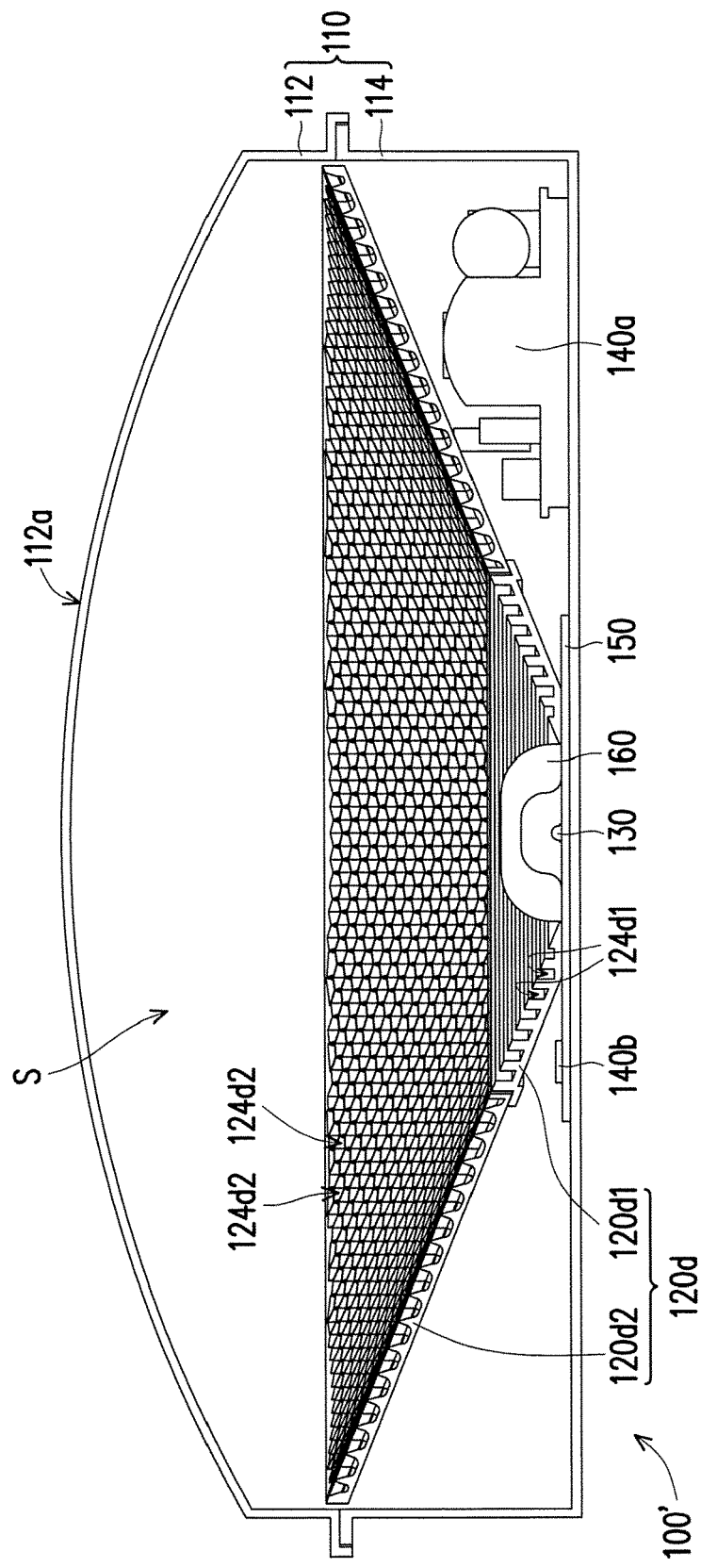
FIG. 4A is a cross-sectional schematic view of a light emitting device in yet another embodiment of the invention.

It should be explained that although the light shielding caps 120a, 120b, and 120c are all integrally formed structures. However, in another embodiment, referring to FIG. 4A and FIG. 4B, a light shielding cap 120d of a light emitting device 100' includes a first light shielding cap 120d1 and a second light shielding cap 120d2. In addition, the first light shielding cap 120d1 is assembled to the second light shielding cap 120d2. The first light shielding cap 120d1 is located between the second light shielding cap 120d2 and the light emitting unit 130. As shown in FIG. 4A, cavity structures 124d1 of the first light shielding cap 120d1 are implemented as concentric circles arranged outward one circle after another. In addition, top-view shapes of the cavity structures 124d1 are, for example, a circular shape. Top-view shapes of cavity structures 124d2 of the second light shielding cap 120d2 are, for example, a hexagonal shape. Nevertheless, the invention is not limited to the above.

In brief, with the design of the light shielding caps 120a, 120b, 120c, and 120d of the light emitting devices 100 and 100', when the ambient light L is emitted into the containing space S of the casing 110, the ambient light L is reflected and spread for multiple times in the cavity structures 124a, 124b, 124c, 124d1, and 124d2 of the light shielding caps 120a, 120b, 120c, and 120d and thus absorbed, and thereby the chance that the ambient light L is reflected to the viewer after being irradiated into the casing 110 is reduced. Besides, when the ambient light L is focused by the lens part 112a of the casing 110, the design of the light shielding caps 120a, 120b, 120c, and 120d may advance or interfere with the focused position of the ambient light L as well as receiving the energy of the incident ambient light L. Accordingly, the focused point may be prevented from being located at the internal components 140a and 140b, thereby avoiding the damages to the internal components 140a and 140b due to a high temperature.

It should be explained that the same reference numerals and part of the content from the previous embodiments are applied in the following embodiments. Identical reference numerals are adapted to show identical or similar components. Descriptions on the same technical content are omitted. Please refer to the previous embodiments for the omitted descriptions for they are not repeated again hereinafter.

Figure 5:
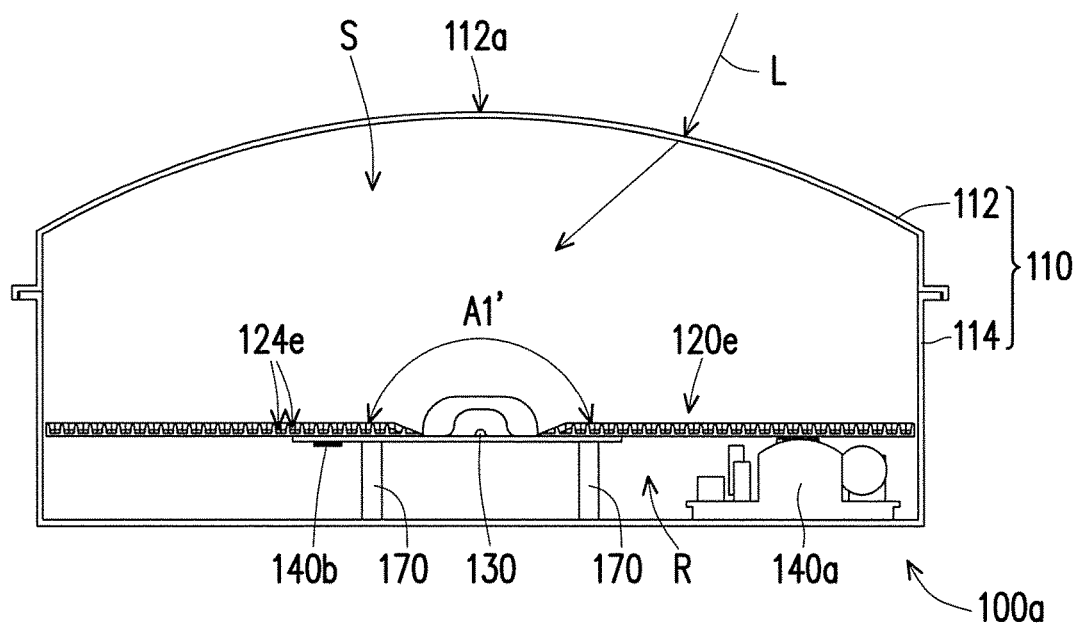
FIG. 5 is a schematic cross-sectional view of a light emitting device in yet another embodiment of the invention.

FIG. 5 is a schematic cross-sectional view of a light emitting device in yet another embodiment of the invention. Referring to FIG. 5 and FIG. 1B together, a light emitting device 100a in this embodiment is similar to the light emitting device in FIG. 1B. Differences between the two light emitting devices lie in: a light shielding cap 120e in this embodiment is essentially disposed parallel to the rear cover 114 and the light emitting device 100a in this embodiment further includes a plurality of supporting columns 170 disposed on the rear cover 114 and are configured to support the light shielding cap 120e.

More specifically, as shown in FIG. 5, the supporting columns 170 are located between the light shielding cap 120e and the rear cover 114 to define a configuration space R between the light shielding cap 120e and the rear cover 114. In addition, the internal components 140a and 140b are disposed in the configuration space R. When the ambient light L incident into the accommodation space S of the casing 110, the ambient light L may be reflected and spread for multiple times in cavity structures 124e of the light shielding cap 120e and thus be absorbed. Accordingly, the chance that the ambient light L is reflected to the viewer after being irradiated into the casing 110 is reduced. Besides, when the ambient light L is focused by the lens part 112a of the casing 110, the design of the light shielding cap 120e may advance or interfere with the focused position of the ambient light L as well as receiving the energy of the incident ambient light L. Accordingly, the focused point may be prevented from being located at the internal components 140a and 140b, thereby avoiding the damages to the internal components 140a and 140b due to a high temperature. Here, the light shielding cap 120e is essentially disposed horizontally. That is to say, a light shielding angle A1' of the light shielding cap 120e is configured to be 180 degree. Referring to FIG. 1D, top-view shapes of the cavity structures 124e are specifically a hexangular shape. Nevertheless, the invention is not limited to the above.

Figure 4B:
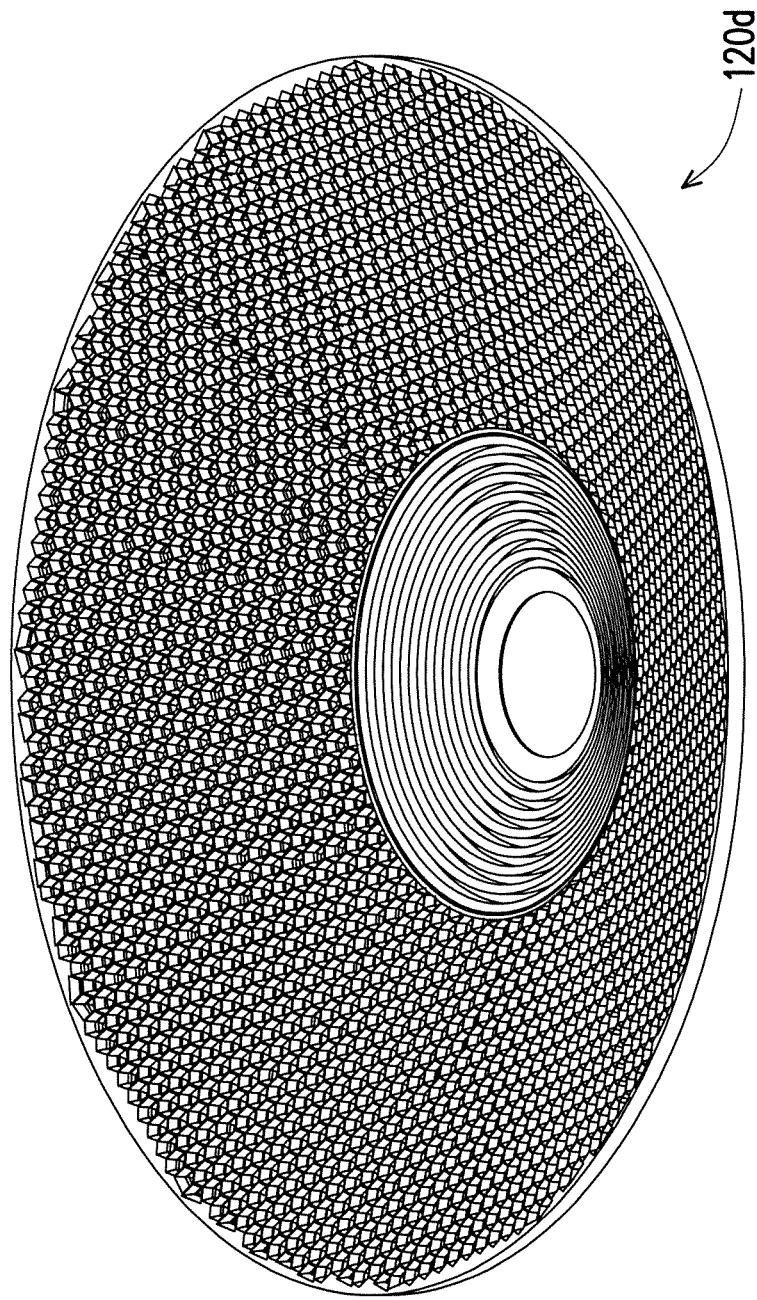
FIG. 4B is a three-dimensional schematic view of the light shielding cap in FIG. 4A.
Figure 6:
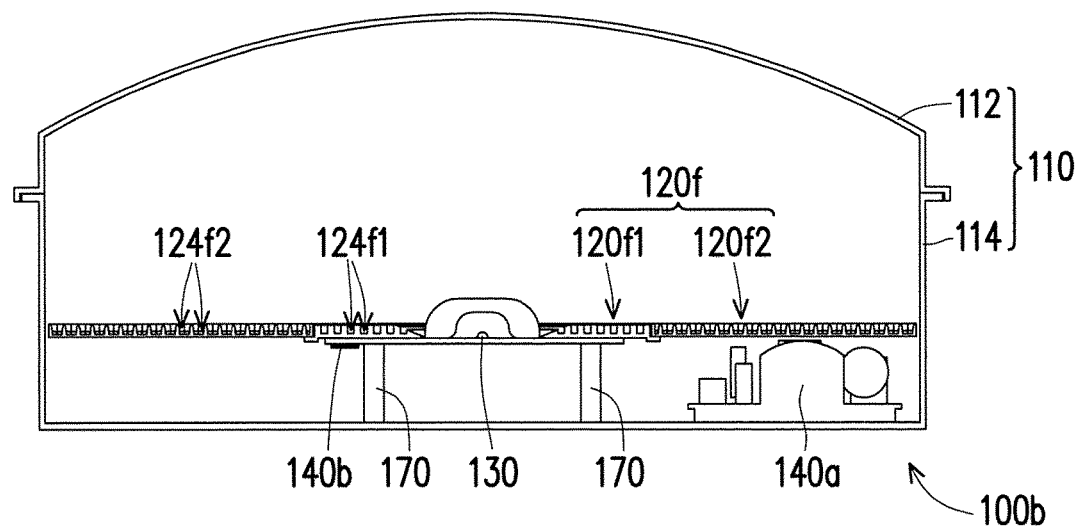
FIG. 6 is a schematic cross-sectional view of a light emitting device in yet another embodiment of the invention.

FIG. 6 is a schematic cross-sectional view of a light emitting device in yet another embodiment of the invention. Referring to FIG. 6 and FIG. 5 together, a light emitting device 100b in this embodiment is similar to the light emitting device 100a in FIG. 5. A difference between the two light emitting devices lies in: a light shielding cap 120f in this embodiment includes a first light shielding cap 120f1 and a second light shielding cap 120f2. The first light shielding cap 120f1 is assembled to the second light shielding cap 120f2, and the first light shielding cap 120f1 is located between the second light shielding cap 120f2 and the light emitting unit 130. Here, cavity structures 124f1 of the first light shielding cap 120f1 implemented as concentric circles arranged outward one circle after another. Top-view shapes of the cavity structures 124f1 are, for example, a circular shape. Referring to FIG. 4B, top-view shapes of cavity structures 124f2 of the second light shielding cap 120f2 are, for example, a hexangular shape.

Figure 7:
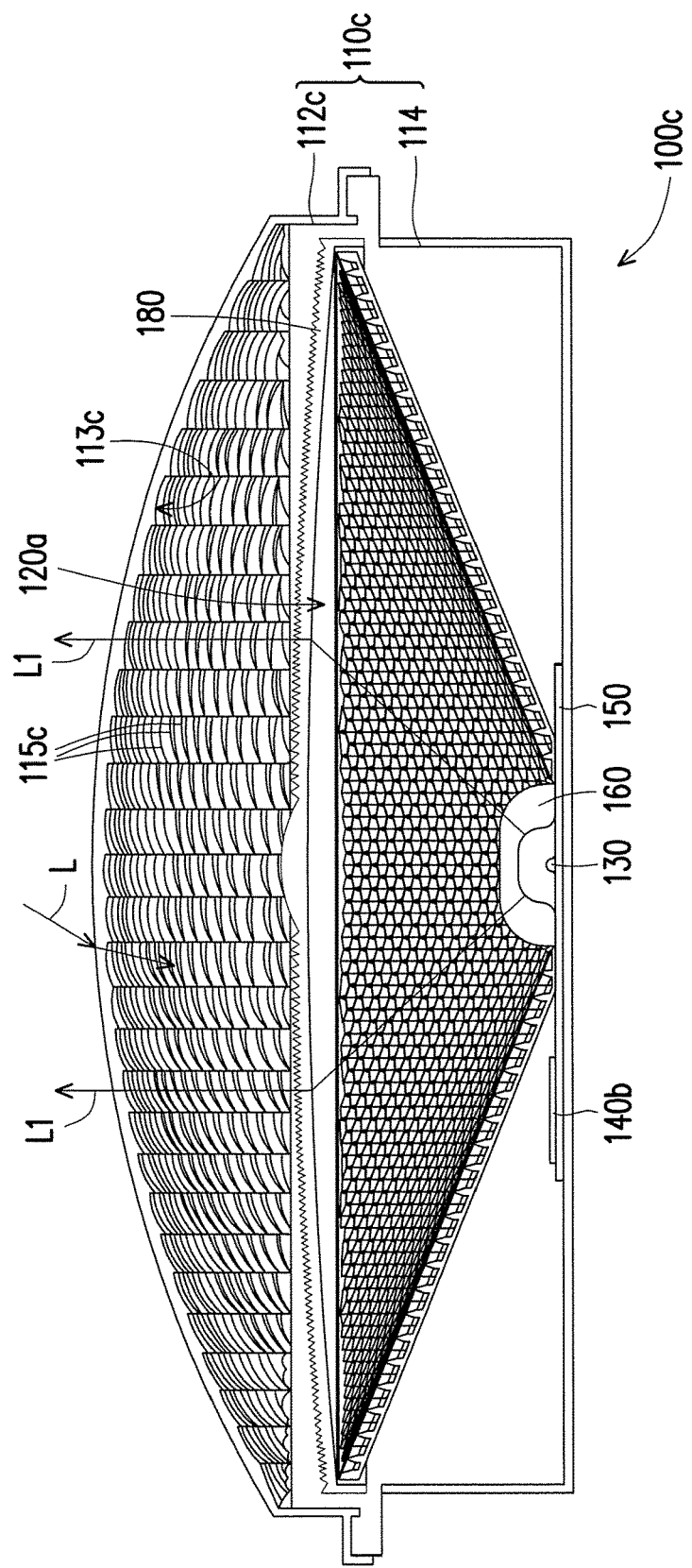
FIG. 7 is a schematic cross-sectional view of a light emitting device in yet another embodiment of the invention.

FIG. 7 is a schematic a cross-sectional view of a light emitting device in yet another embodiment of the invention. Referring to FIG. 7 and FIG. 1B together, a light emitting device 100c in this embodiment is similar to the light emitting device 100 in FIG. 1B. A difference between the two light emitting devices lies in: the light emitting device 100c in this embodiment further includes a Fresnel lens 180. The Fresnel lens 180 is disposed on the light shielding cap 120a to straighten a beam L1 emitted by the light emitting unit 130. Additionally, an internal surface 113c of a front cover 112c of a casing 110c in this embodiment has a plurality of micro structures 115c, wherein the micro structures 115c are connected to one another. Since a surface curvature of the micro structures 115c within the front cover 112c causes the light to refract, the straightened beam L1 can be able incident at a different directions and angles, thereby satisfying the regulatory light intensity requirement.

Figure 8:
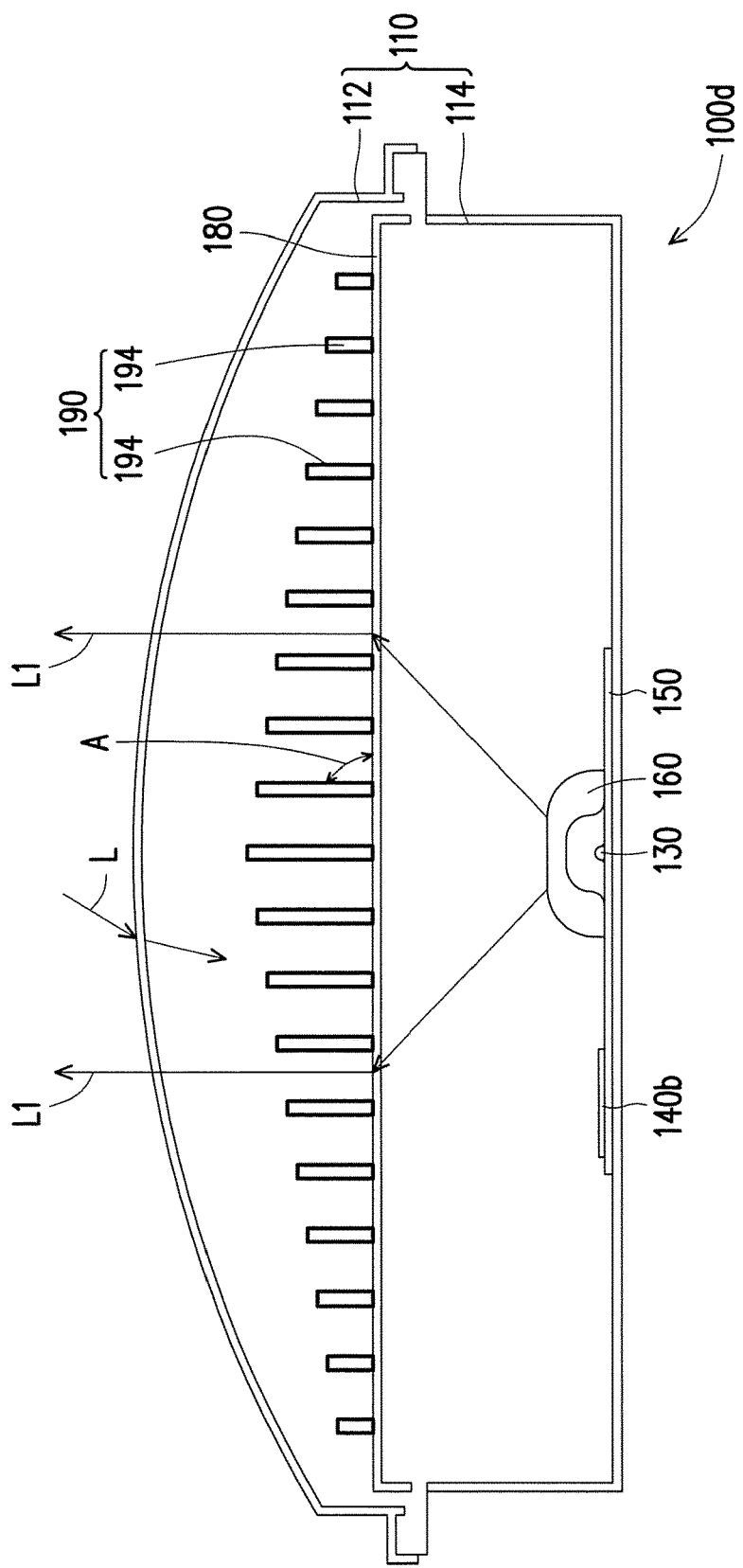
FIG. 8 is a schematic cross-sectional view of a light emitting device in yet another embodiment of the invention.

FIG. 8 is a schematic cross-sectional view of a light emitting device in yet another embodiment of the invention. Referring to FIG. 8 and FIG. 1B together, a light emitting device 100d in this embodiment is similar to the light emitting device 100 in FIG. 1B. A difference between the two light emitting devices lies in: a light absorption grating 190 is specifically adapted in this embodiment as a light blocking member. More specifically, the light emitting device 100d in this embodiment further includes a Fresnel lens 180. The Fresnel lens 180 is disposed between the light absorption grating 190 and the light emitting unit 130, so as to straighten the beam L1 emitted by the light emitting unit 130. The light absorption gate 190 includes a plurality of light absorbing structures 194 separated from one another and disposed on the Fresnel lens 180. A length and a width of each of the light absorbing structures 194 respectively fall in a range from 10 mm to 300 mm. A thickness of each of the each of the light absorbing structures 194 falls in a range from 0.1 mm to 10 mm. A dark material may be adapted as a material for the light absorbing structures 194, or surfaces of the light absorbing structures 194 may be coated with a dark material, such that the ambient light L is more easily absorbed. Preferably, a number of the light absorbing structures 194 falls, for example, in a range from 2 sheets to 10000 sheets, wherein the greater the number of the light absorbing structures 194, the better the light absorption efficiency. An inclination angle A of each of the light absorbing structures 194 to the Fresnel lens 180 falls, for example, in a range from 0 degree to 180 degree and may be adjusted correspondingly with the light shielding requirement. Here, the inclination angle A is depicted as 90 degree as an example, but the invention in not limited thereto.

Upon actual measurement, a beam emitted by a known light emitting unit without a light absorption grating is approximately 640 candela (cd), a reflective light of an ambient light is approximately 40 cd, while a sun phantom value is 640/16=16. After the light emitting unit 130 is equipped with the light absorption grating 190, the beam L1 emitted by the light emitting unit 130 reduces by approximately 10%, in other words the beam L1 is 576 cd, a reflective light of the ambient light L reduces by 40%, in other words 24 cd, while the sun phantom value is 576/24=24.

Since the light absorption grating 190 is adapted as a light blocking member in this embodiment and blocks the ambient light L incident into the casing 110 in an absorbent manner, and thereby reduce the chance that the ambient light L is reflected to the viewer after being irradiated into the casing 110. Accordingly, when the light emitting unit 130 is not lit up, the viewer may be prevented from being misled to perceive that the light emitting device 100 emits light. Additionally, a design of the light absorption grating 190 in this embodiment is able to make the ambient light L be absorbed before the ambient light L is incident onto the internal component 140b. A high temperature is prevented from being generated by the focusing of the ambient light L and thus the internal component 140b is prevented from being damaged by the high temperature.

Figure 9:
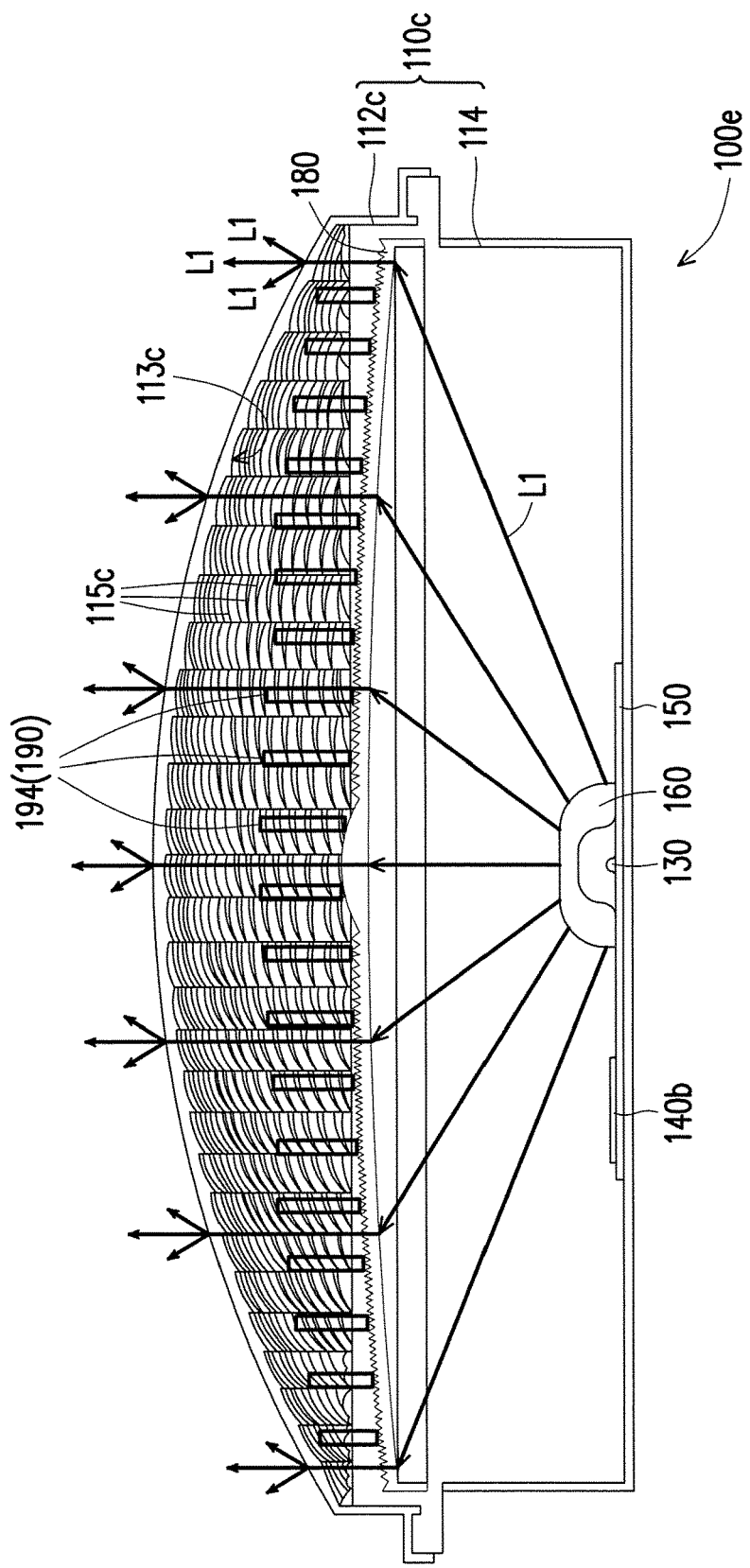
FIG. 9 is a schematic cross-sectional view of a light emitting device in yet another embodiment of the invention.

FIG. 9 is a schematic cross-sectional view of a light emitting device in yet another embodiment of the invention. Referring to FIG. 9 and FIG. 8 together, a light emitting device 100e in this embodiment is similar to the light emitting device 100d in FIG. 8. A difference between the two light emitting devices lies in: an internal surface 113c of a front cover 112c of a casing 110c of the light emitting device 100e in this embodiment has a plurality of micro structures 115c. The micro structures 115c are connected to one another. Since a surface curvature of the micro structures 115c within the front cover 112c causes the light to refract, the straightened beam L1 can be able incident at a different directions and angles, thereby satisfying the regulatory light intensity requirement.

Figure 10:
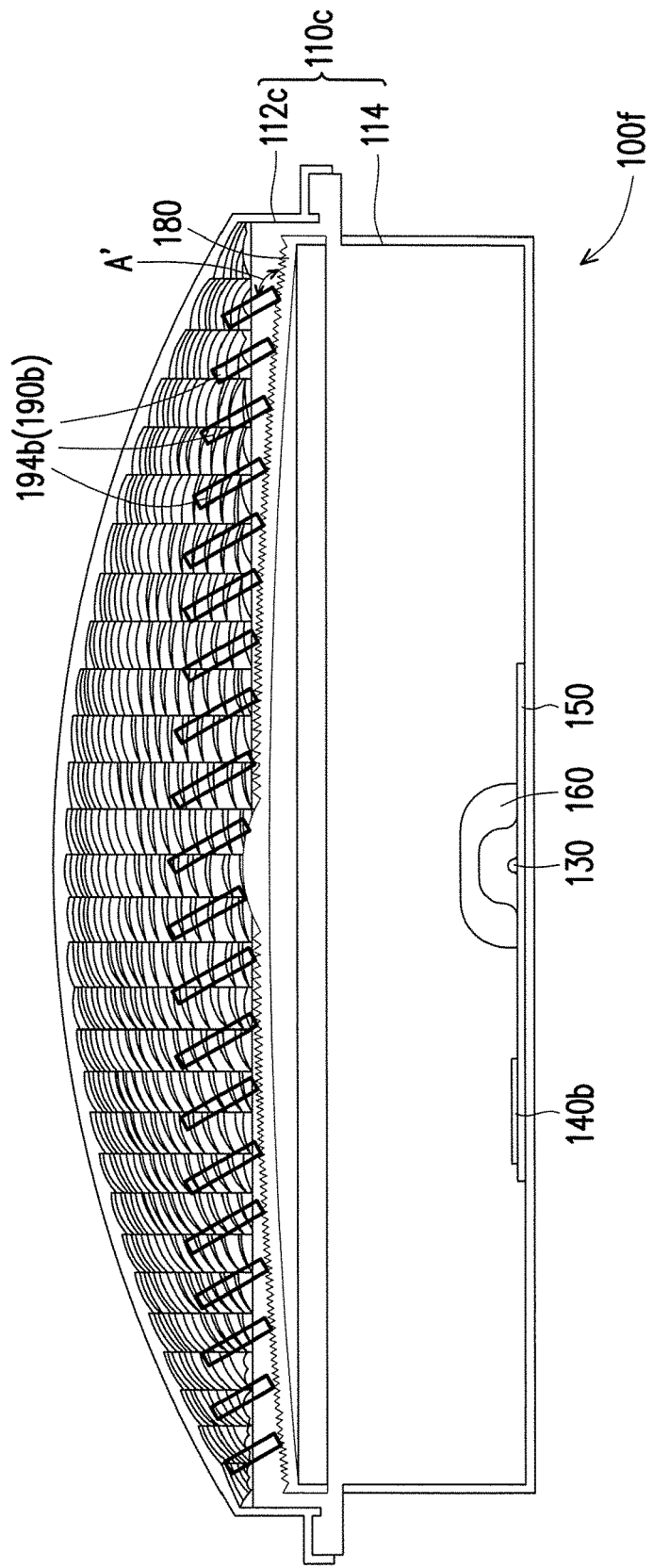
FIG. 10 is a schematic cross-sectional view of a light emitting device in yet another embodiment of the invention.

FIG. 10 is a schematic cross-sectional view of a light emitting device in yet another embodiment of the invention. Referring to FIG. 10 and FIG. 9 together, a light emitting device 100f in this embodiment is similar to the light emitting device 100e in FIG. 9. A difference between the two light emitting devices lies in: each of light absorbing structures 194b of a light absorption grating 190b in this embodiment is relatively tilted to the Fresnel lens 180 in an angle A'. The angle A' may fall in a range from 0 degree to 180 degree and may be adjusted according to light blocking needs. The invention does not set limitations in this regard.

Figure 11:
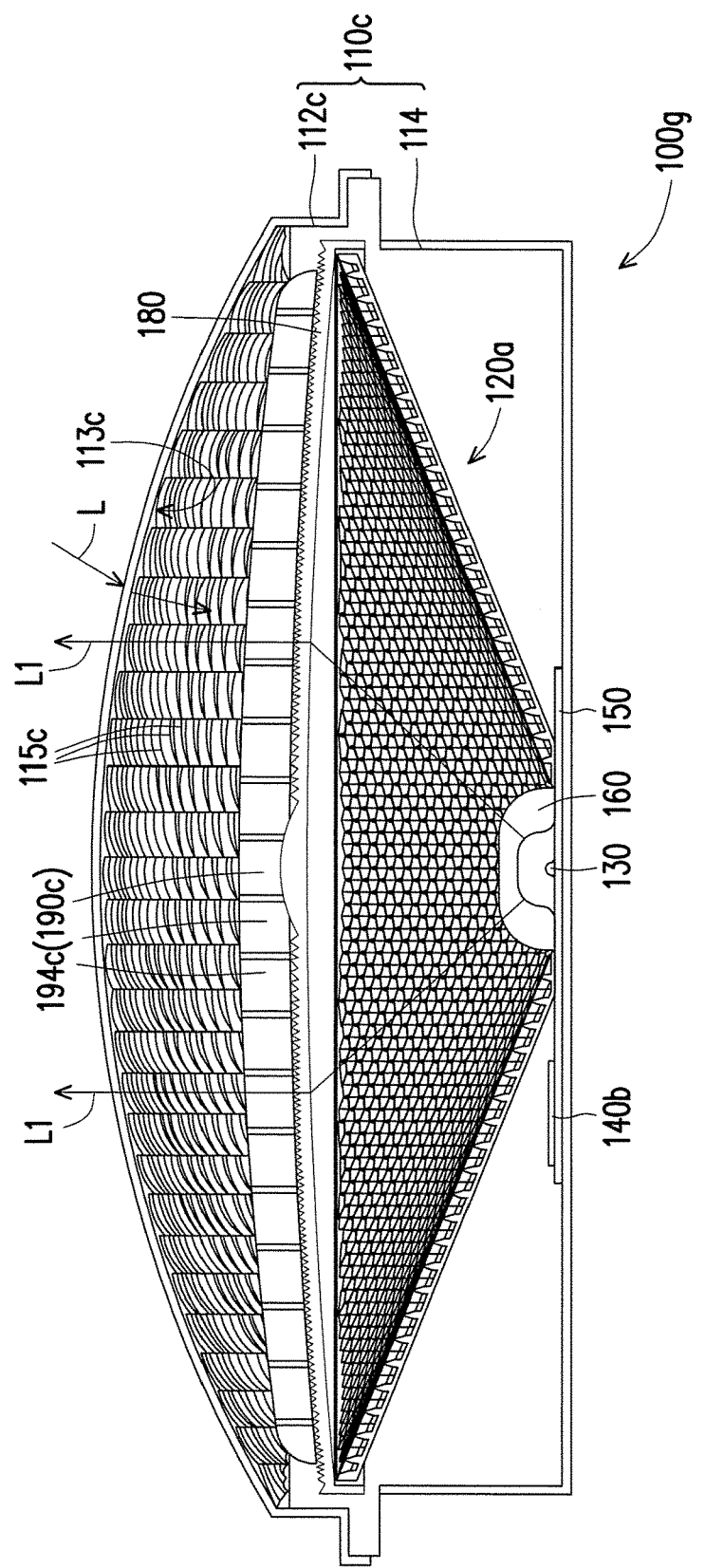
FIG. 11 is a schematic cross-sectional view of a light emitting device in yet another embodiment of the invention.

FIG. 11 is a schematic cross-sectional view of a light emitting device in yet another embodiment of the invention. Referring to FIG. 11 and FIG. 9 together, a light emitting device 100g in this embodiment is similar to the light emitting device 100e in FIG. 9. A difference between the two light emitting devices lies in: a light blocking member in this embodiment consists of the light shielding cap 120a and the light absorption grating 190c. The light absorption grating 190c is disposed on the light shielding cap 120a and blocks the ambient light L incident into the casing 110c in an absorbent manner. The light shielding cap 120a is located between the light absorption grating 190c and the light emitting unit 130 and blocks the ambient light L incident into the casing 110c in a multi-reflection manner.

More specifically, as shown in FIG. 11, the Fresnel lens 180 in this embodiment is located between the light shielding cap 120a and the light absorption grating 190c. The Fresnel lens 180 is disposed on the light shielding cap 120a. The light absorbing structures 194c of the light absorption grating 190c are disposed in disperse on the Fresnel lens 180. When the beam L1 emitted by the light emitting unit 130 passes through a secondary optical component, that is to say a lens 160 forms a parallel light with the Fresnel lens 180, the beam L1 is incident into the micro structures 115c of the front cover 112c. Since a surface curvature of the micro structures 115c within the front cover 112c causes the light to refract, the straightened beam L1 can be able incident at a different directions and angles, thereby satisfying the regulatory light intensity requirement.

In conclusion of the above, in the design of the light emitting device of the invention, the light blocking member is adapted to block an ambient light incident into the casing and thereby reduce the chance that the ambient light is reflected to the viewer after being irradiated into the casing. Accordingly, when the light emitting unit is not lit up, the viewer may be prevented from being misled to perceive that the light emitting device emits light. In addition, the design of the light blocking member of the invention may further change the focused position of the ambient light, so as to avoid damages to the internal components due to a high temperature caused by focusing of the light.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A light emitting device, comprising:
   a casing;

a light blocking member disposed within the casing, and is adapted to block an ambient light incident into the casing; and a light emitting unit disposed within the casing, wherein the light blocking member is a light shielding cap having an accommodation opening and a plurality of cavity structures disposed around the accommodation opening, each of the plurality of cavity structures blocks the ambient light incident into the casing in a multi-reflection manner, and the light emitting unit is disposed in the accommodation opening correspondingly.

2. The light emitting device as recited in claim 1, wherein a top-view shape of each of the plurality of the cavity structures comprises a polygon shape, a circular shape, an oval shape, or an irregular shape, and a ratio of a depth to a width of each of the plurality of the cavity structures fall in a range from 1 to 100.

3. The light emitting device as recited in claim 1, wherein a surface of the light blocking member is coated with a light absorbing material.

4. The light emitting device as recited in claim 1, wherein depths of the plurality of the cavity structures are identical or different.

5. The light emitting device as recited in claim 1, wherein a blocking angle of the light blocking member is greater than a light emitting angle of the light emitting unit.

6. The light emitting device as recited in claim 1, wherein the light blocking member comprises a first light shielding cap and a second light shielding cap, the first light shielding cap is assembled with the second light shielding cap, and the first light shielding cap is located between the second light shielding cap and the light emitting unit.

7. The light emitting device as recited in claim 1, further comprising:
a Fresnel lens disposed on the light blocking member to straighten a beam emitted by the light emitting unit.

8. The light emitting device as recited in claim 1, wherein the light blocking member further comprises a light absorption grating, the light absorption grating is disposed on the light shielding cap and blocks the ambient light incident into the casing in an absorbent manner, the light shielding cap is located between the light absorption grating and the light emitting unit and blocks the ambient light incident into the casing in a multi-reflection manner.

9. The light emitting device as recited in claim 8, wherein the light shielding cap has an accommodation opening and a plurality of cavity structures disposed around the accommodation opening, each of the plurality of cavity structures blocks the ambient light incident into the casing in a multi-reflection manner, the light emitting unit is disposed in the accommodation opening correspondingly.

10. The light emitting device as recited in claim 8, further comprising:
a Fresnel lens disposed between the light shielding cap and the light absorption grating to straighten a beam emitted by the light emitting unit.

11. The light emitting device as recited in claim 10, wherein the light absorption grating comprises a plurality of light absorbing structures separated from one another and disposed on the Fresnel lens, a length and a width of each of the plurality of the light absorbing structures fall in a range from 10 mm to 300 mm, a thickness of each of the plurality of the light absorbing structures falls in a range from 0.1 mm to 10 mm, a number of the plurality of the light absorbing structures falls in a range from 2 sheets to 10000 sheets, an inclination angle of each of the plurality of the light absorbing structures with respect to the Fresnel lens falls in a range from 0 degree to 180 degree.

12. The light emitting device as recited in claim 1, wherein the casing comprises a front cover and a rear cover, the front cover is assembled with the rear cover and defines an accommodation space with the rear cover, the light blocking member and the light emitting unit are located in the accommodation space.

13. The light emitting device as recited in claim 12, wherein the front cover has a lens part, the ambient light enters the casing through the lens part.

14. The light emitting device as recited in claim 12, wherein the light blocking member and the light emitting unit are disposed on the rear cover of the casing.

15. The light emitting device as recited in claim 14, wherein the light blocking member is a light shielding cap, a first vertical distance is provided between a side of the light shielding cap relatively adjacent to the light emitting unit and the rear cover, a second vertical distance is provided between another side of the light shielding cap relatively distant to the light emitting unit and the rear cover, the second vertical distance is greater than the first vertical distance, and the light shielding cap is in a funnel shape.

16. The light emitting device as recited in claim 12, further comprising:
at least one internal component disposed on the rear cover of the casing, wherein an orthographic projection of the light blocking member on the rear cover overlaps an orthographic projection of the internal component on the rear cover.

17. The light emitting device as recited in claim 12, wherein the light blocking member is disposed parallel to the rear cover.

18. The light emitting device as recited in claim 17, the light blocking member being a light shielding cap, the light emitting device further comprising:
a plurality of supporting members disposed between the light shielding cap and the rear cover, so as to define a configuration space between the light shielding cap and the rear cover.

19. The light emitting device as recited in claim 12, wherein an internal surface of the front cover has a plurality of micro structures, the plurality of the micro structures are connected to one another.

\* \* \* \* \*